United States Patent [19]
Haikawa et al.

[11] Patent Number: 5,138,500
[45] Date of Patent: Aug. 11, 1992

[54] MAGNETIC TAPE RECORDING/REPRODUCING DEVICE FOR RECORDING DIGITAL ACOUSTIC AND VIDEO SIGNALS

[75] Inventors: Yukihiko Haikawa; Toshiji Ishii, both of Higashihiroshima, Japan

[73] Assignee: Sharp Kabushiki Kaisha, Osaka, Japan

[21] Appl. No.: 442,599

[22] Filed: Nov. 29, 1989

[30] Foreign Application Priority Data

Nov. 29, 1988 [JP] Japan .................. 63-303432

[51] Int. Cl.⁵ .............................................. G11B 5/02
[52] U.S. Cl. ................................ 360/19.1; 360/36.1; 358/341
[58] Field of Search ................. 360/33.1, 32, 36.2, 360/19.1; 358/310, 335, 341

[56] References Cited

U.S. PATENT DOCUMENTS

| | | | |
|---|---|---|---|
| 4,399,471 | 8/1983 | Preuss | 358/341 X |
| 4,499,506 | 2/1985 | Takahashi et al. | 360/33.1 X |
| 4,575,772 | 3/1986 | Shimada et al. | 360/33.1 X |
| 4,602,295 | 7/1986 | Moriyama et al. | 358/341 X |
| 4,901,159 | 2/1990 | Hitotsumachi | 360/33.1 X |

Primary Examiner—Andrew L. Sniezek

[57] ABSTRACT

A magnetic tape recording/reproducing device samples analog acoustic signals and converts the signals into digital acoustic signals. Analog video signals are sampled for every field and converted into digital video signals. The converted digital acoustic signals and digital video signals are recorded sequentially on a magnetic tape so that both the digital acoustic and digital video signals can be reproduced properly.

4 Claims, 2 Drawing Sheets

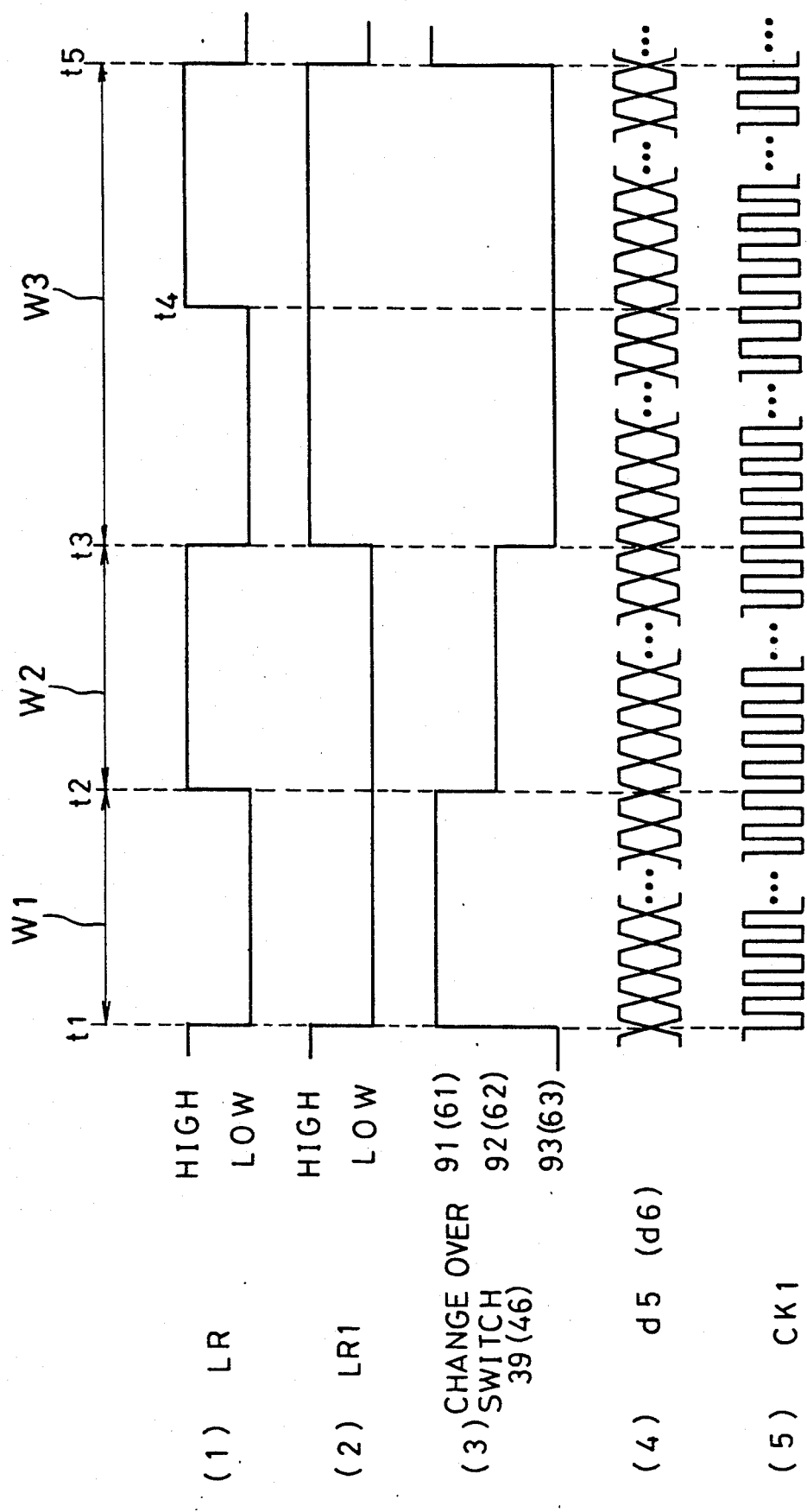

MAGNETIC TAPE RECORDING/REPRODUCING DEVICE FOR RECORDING DIGITAL ACOUSTIC AND VIDEO SIGNALS

BACKGROUND OF THE PRESENT INVENTION

1. Field of the Present Invention

The present invention relates to a magnetic tape recording/reproducing device generally called DAT (digital audio tape recorder) for recording/reproducing digital signals.

2. Description of the Related Art

Conventionally, a magnetic tape recording/reproducing device called DAT (digital audio tape recorder) is capable of recording and reproducing acoustic sounds by converting the signals to a digital form on a magnetic tape. Additional information for correcting recording errors, such as parity error can be recorded simultaneously, so that even when part of the information to be recorded is omitted, an original sound can be accurately reproduced with considerably less noise.

In the magnetic tape recording/reproducing device, operational modes are selected which correspond to the acoustic signals to be recorded on 2 channel, 4 channel mode and so on. The channels are recording ranges assigned to the number of acoustic signals to be recorded. Two channel mode provides for two acoustic signals to be recorded and reproduced and therefore two acoustic signals can be reproduced by two speakers which correspond to the front-left and front-right sides of the audience. Also, the four channel mode can record four kinds of acoustic signals for recording and reproduction, so that four kinds of acoustic signals can be reproduced by four speakers which correspond to the front-left and front-right and rear-left and rear-right sides of the audience.

However, in the case of recording four different acoustic signals by the above-mentioned magnetic tape recording/reproducing device, four speakers are necessary for reproduction of the signal, leading to an increase in the number of audio components. Thus, recording/reproducing operation of digital signals through the 4 channel mode has rarely been attempted.

Also, since only acoustic signals can be recorded by the magnetic tape recording/reproducing device, use of the device has been limited.

OBJECT AND SUMMARY OF THE PRESENT INVENTION

The present invention is to provide a magnetic tape recording/reproducing device with much wider application and improved utility.

According to the present invention, there is provided a magnetic tape recording/reproducing device comprising: acoustic A/D converting means for converting an analog acoustic signal into a digital acoustic signal by sampling the analog signal during a first sampling cycle; video A/D converting means for converting an analog video signal into a digital video signal by sampling the analog video signal during a second sampling cycle at each field or frame; recording means for recording on magnetic tape sequentially during the first sampling cycle the digital acoustic signal converted by the acoustic A/D converting means and the digital video signal converted by the video A/D converting means; and reproducing means for reproducing the digital acoustic signals and the digital video signals recorded on the magnetic tape.

The reproducing means preferably comprises: reading means for reading sequentially during the first sampling cycle the digital acoustic signals and the digital video signals recorded on the magnetic tape; acoustic D/A converting means for converting the digital acoustic signal read by the reading means into an analog acoustic signal; first and second memory means in which the digital video signals can be written; writing means for writing the digital signals read by the reading means alternately into the first and second memory means at each field or frame; read-out means for reading out alternately from the first and second memory means the digital video signals written by the writing means after completing writing of the signals at each field or frame; and video D/A converting means for converting the digital video signals read out by the read-out means into analog video signals.

Further, the recording means preferably comprises: first and second memory means in which each has a memory range whereby digital signals at each field or frame can be written; writing means for writing the digital acoustic signals converted by the acoustic A/D converting means sequentially into the first memory means and for writing the digital video signals converted by the video A/D converting means into the second memory means in each cycle of one field or frame; read-out means for reading out of the first and second memory means, after completely writing the entire memory range of the first and second memory means, the digital acoustic signals and the digital video signals in the order of the writing sequence in the memories; and tape recording means for recording on the magnetic tape during the first sampling cycle sequentially the digital acoustic signals and digital video signals read out by the read-out means.

According to the device of the present invention, the acoustic signals and the video signals can be sequentially recorded on magnetic tape, and when reproducing both the acoustic and video signals, the video signals can be displayed on a display device such as CRT (Cathode Ray Tube) and the acoustic signals can be converted to sound by speakers, etc.

BRIEF DESCRIPTION OF THE DRAWINGS

FIG. 2 is a timing chart for clarification of operation of the device in FIG. 1.

DESCRIPTION OF THE PREFERRED EMBODIMENT

Figure 1:
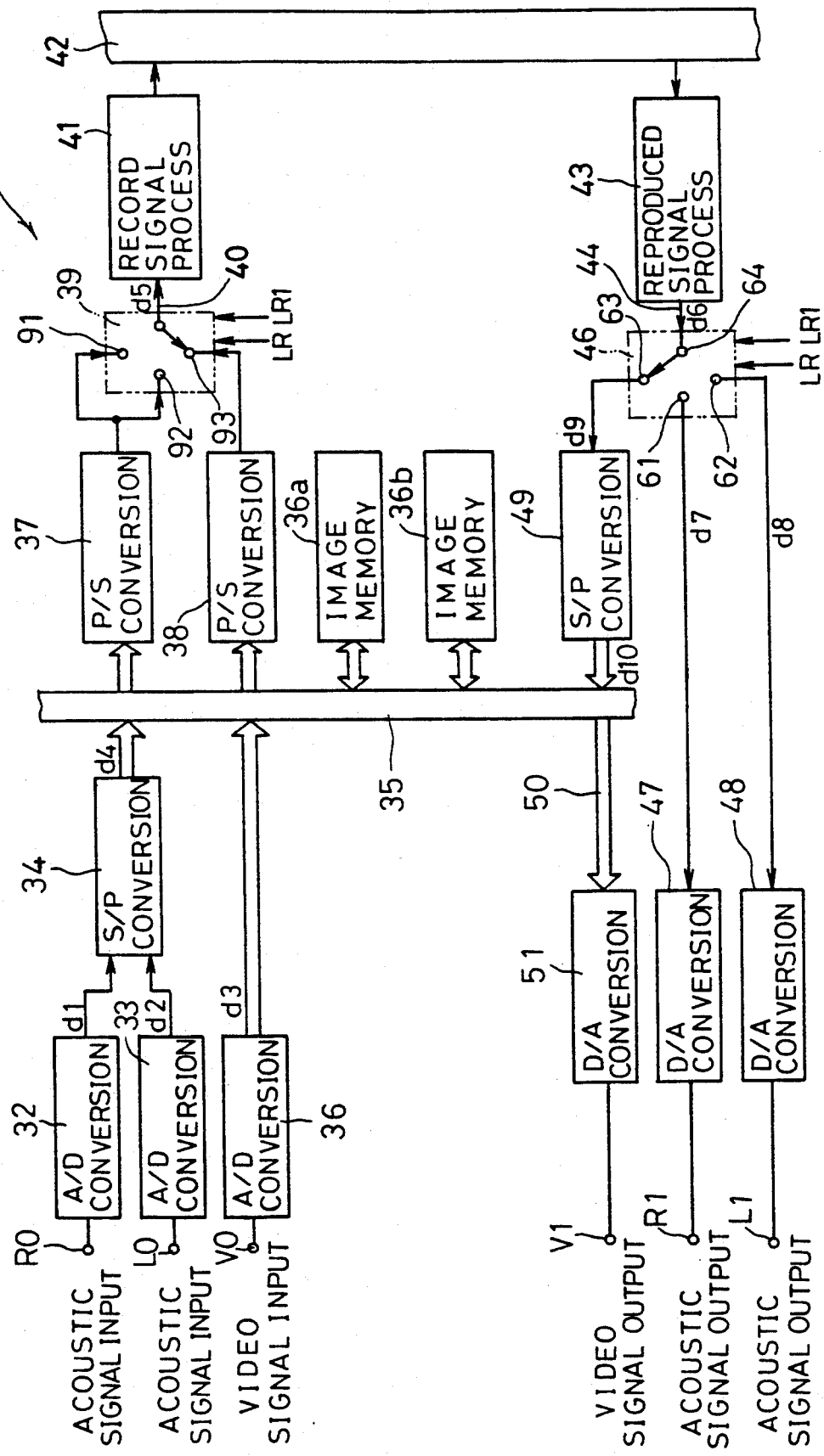
FIG. 1 is a block diagram showing the fundamental construction of the magnetic tape recording/reproducing device illustrated as one embodiment of the present invention.

In the magnetic tape recording/reproducing device of the present invention, the first sampling frequency for converting analog acoustic signals into digital acoustic signals uses such variations of frequencies as 32 kHz, 44.1 kHz or 48 kHz.

Acoustic A/D converting means employs such a construction which samples analog acoustic signals with a frequency of 32 kHz to convert the signals into digital acoustic signals of 12 bits. Also, video A/D converting means employs such a construction which samples analog video signals with a frequency of 14.3 MHz to convert the signals into digital video signals of 8 bits.

Further, the invention preferably employs a recording means that enables so-called 4 channel mode recording to record sequentially on a magnetic tape four kinds of digital acoustic signals at the beginning of each sampling cycle.

FIG. 1 is a block diagram showing the essential construction of the magnetic tape recording/reproducing device 31 as one embodiment of the present invention. The magnetic tape recording/reproducing device 31 can make recording/reproducing operation in the so-called 4 channel mode that records and reproduces acoustic signals corresponding to four speakers arranged front-left and front-right and rear-left and rear-right sides of the audience. In the present embodiment, two of the channels are assigned to acoustic signals and the remaining channels to video signals. In other words, the acoustic signals are of two kinds corresponding to the speakers located at the front-right and front-left sides of the audience.

The two kinds of acoustic signals are inputted through input terminals R0,L0 onto the magnetic tape recording/reproducing device 31 and applied to Analog/Digital Conversion Circuit (called hereinafter "A/D" 32, 33 respectively). In A/D conversion circuit 32, 33, analog acoustic signals are sampled, for example, with sampling frequency of 32 kHz and converted into digital signals d1, d2 for example of 12 bits. The digital acoustic signals d1, d2 are sequentially applied to Serial/Parallel conversion circuit 34 (called hereinafter "S/P") from the A/D conversion circuit 32, 33, and further fed in parallel at every 8 bits to data bus 35.

Video signals are inputted through input terminal V0 and applied to the A/D conversion circuit 36 to be converted into digital signals d3. The A/D conversion circuit 36 samples analog video signals with sampling frequency, for example, of 14.3 MHz to convert the analog video signals into digital video signals d3 for example of 8 bits and feeds the same in parallel to the data bus 35.

The digital video signals d3 are written in one image memory 36a among image memories 36a, 36b which are memory means and connected to the data bus 35. A still picture of one scene is expressed by a video signal on one field, i.e., at 1/60 sec. Thus, writing of the digital signals d3 for one scene into the image memory 36a requires a time of 1/60 sec.

Digital acoustic signal d4 applied to the data bus 35 by the S/P conversion circuit 34 is written in the other image memory 36b which has not been used for storing the digital video signals d3. The digital acoustic signals d4 written in the image memory 36b are not read out before writing the digital acoustic signals into an entire memory range of the image memory 36b is completed. When storing of the entire memory range is completed, the digital acoustic signals are read out sequentially one by one and fed to the data bus 35. The digital acoustic signals read out and fed to the data bus 35 are applied to Parallel/Serial (called hereinafter "P/S") conversion circuit 37, and the digital video signals memorized in the image memory 36a are applied to the P/S conversion circuit 38.

The digital acoustic signals serially taken from P/S conversion circuit 37 are directed to input terminals 91, 92 of the changeover switch 39. Also, the digital video signals taken serially from the P/S conversion circuit 38 are applied to the input terminal 93 of the changeover switch 39. The digital signals sequentially and circularly flow between the output terminal and the input terminals 91-93 at the changeover switch 39, so that digital signals d5 directed to line 40 from the output terminal are applied to a recording signal processing unit 41.

In the recording signal processing unit 41, input digital signals d5 are modulated and errors are corrected by parity. The processed signals are recorded on magnetic tape 42 through a rotary head (not shown).

Upon reproduction of the recorded signals in the magnetic tape 42, the signals are applied through the rotary head to the signal processing unit 43.

In the reproduced signal processing unit 43, the signals are modulated and signals errors are corrected by parity. The reproduced signals are applied through the line 44 to an input terminal 44 at the changeover switch 46.

Output terminals 61, 62 of the changeover switch 46 are each connected to Digital/Analog (called hereinafter "D/A") conversion circuit 47, 48 respectively. Also, an output terminal 63 is connected to S/P conversion circuit 49. Changeover operation (described later) of switch 46 allows the reproduced signals to flow sequentially and circularly between the input terminal 64 and the output terminals 61-63. In this way, the D/A conversion circuit 47, 48 are given digital acoustic signals d7, d8 corresponding to speakers arranged at front-right and front-left sides of the audience. In the D/A conversion circuit 47, 48, the digital acoustic signals d7, d8 are converted into analog acoustic signals and directed to output terminals R1, L1 of the magnetic tape recording-/reproducing device 31.

In this instance, the digital video signal d9 is fed to the S/P conversion circuit 49 in parallel at every 8 bits to the data bus 35. The digital video signal d10 in that way is inputted to one of the image memories 36a, or 36b, leaving the other to supply the content of its memory to the D/A conversion circuit 51 through the data bus 35 and line 50.

During writing of the digital video memory d10 into any one of the image memories, the other image memory allows its contents to be cyclically read out at every 1/60 sec, so that video signals expressing still pictures corresponding to digital video signals recorded in any one of the abovementioned memories are sequentially fed to an output terminal V1 connected to the D/A conversion circuit 51. The video signals expressing a still picture can be displayed on a CRT (Cathode Ray Tube).

FIG. 2 is a timing chart clarifying operation of the magnetic tape recording/reproducing device 31. FIG. 2 (1) and FIG. 2 (2) show switch-control signals LR, LR1 given to the changeover switches 39 (46). FIG. 2 (3) shows a switching operation of the changeover switches 39 (46), and FIG. 2 (4) shows digital signals d5 (d6) fed to the output terminal (input terminal 64) of the changeover switches 39 (46). FIG. 2 (5) shows a clock signal CK1 generated in the record signal processing unit 41 (reproduced signal processing unit 43). In addition, FIG. 2 (3) shows a change of use of input terminals 91, 92, 93 (output terminals 61, 62, 63) connected to the output terminal (input terminal 64) of the changeover switches 39 (46).

At the changeover switch 39 (46), its output terminal (input terminal 64) can be connected with the input terminal 91 (output terminal 61) in case both of the switch-control signals LR, LR1 are at a low level. Also, when the switch-control signal LR1 is at a low level while the switch control signal LR is at a high level, the changeover switch 39 (46) can be connected to the input terminal 92 (output terminal 62), and further to input terminal 93 (output terminal 63) when the switch-control signal LR1 is at a high level.

During the duration W1 of time t1-t2, the switch-control signals LR, LR1 are both at low levels, so that the output terminal is connected to the input terminal 91, whereby digital acoustic signals from the P/S conversion circuit are given to the record signal processing unit 41. The digital acoustic signals fed to unit 41 during the term W1 correspond to those for a speaker arranged at the front-right side of the audience. The record signal processing unit 41 takes for each and every bit of the digital signals d5 through the output terminal and the line 40 synchronously with the rise of the clock signal CK1.

During term W2 of time t2-t3, the switch control signal LR is at a high level while the switch control signal LR1 is at a low level, and during this period of time digital signals fed to the input terminal 92 from the P/S conversion circuit 37 are taken into the record signal processing unit 41. Thus, the digital acoustic signal is fed to a speaker arranged at the front-left side of the audience.

During the term W3 of time t3-t5, the switch control signal LR1 is at a high level, so that the output terminal at the changeover switch 39 is connected to the input terminal 93. Thus, during the term W3, the digital video signals from the P/S conversion circuit 38 are inputted for each and every bit to the record signal processing unit 41.

At time t4, the switch control signal LR rises so that the switch control signal LR reaches a high level during the period of time of t4-t5. However, when the switch control signal is at high level, there is no corresponding effect on switch 39.

The sampling frequency used at A/D conversion circuit 32, 33 is 32 kHz as mentioned. As a result, the switch control signal LR1 has a frequency of 32 kHz. Furthermore, analog acoustic signals input to the A/D conversion circuit 32, 33 are converted into digital acoustic signals d1, d2 of 12 bits, so that digital acoustic signals taken into the record signal processing unit 41 during the term W1, W2 are digital signals of 12 bits. Thus, digital video signals taken into the record signal processing unit 41 during the period W3 are digital signals of 24 bits.

The image memories 36a, 36b have memory capacity P that can memorize digital video signals corresponding to each field of the video signals. Since the period of 1 field is 1/60 sec, sampling frequency at A/D conversion circuit 36 is 14.3 MHz, and digital video signal d3 sampled and converted accordingly is a digital signal of 8 bits, the memory capacity P is represented as follows:

$$P = 14.3 \text{ (MHz)} \times 8 \text{ (bits)} \times 1/60 \text{ (sec)} \quad (1)$$
$$= 1.911 \text{ (}M\text{ bits)}$$

Also, since the switch control signal LR1 has a frequency of 32 kHz and digital video signals of 24 bits are read into the record signal processing unit 41 during each cycle of the switch control signal LR1, the amount of data R, of digital video signals stored in the image memory 36a and read out at 1 sec intervals is represented as follows.

$$R = 32 \text{ (kHz)} \times 24 \text{ (bits)} \quad (2)$$
$$= 768 \text{ (}k\text{ bits/sec)}$$

Thus, reading-out of entire digital video signals memorized in the image memory 36a to the record signal processing unit 41 requires time as follows.

$$P/R = 2.49 \text{ (sec)} \quad (3)$$

Accordingly, video signals inputted from the input terminal V0 are to be recorded in the magnetic tape 42 through the record signal processing unit 41 at a time interval as follows:

$$2.49(\text{sec}) + 1/60(\text{sec}) \approx 2.5(\text{sec}) \quad (4)$$

Acoustic signals inputted through the input terminals R0, L0 are temporarily stored in the image memory 36b. In this case, writing of digital acoustic signals into the image memory 36b at a data amount corresponding to the memory capacity P requires the time interval represented by the abovesaid formula (3), i.e., 2.49 (sec). When the entire range of digital acoustic signals are written into the memory 36b, it supplies sequentially to the P/S conversion circuit 37 the signals written from the earliest to the latest. Thus, the digital acoustic signals fed to the input terminals 91, 92 at the changeover switch 39 from the P/S conversion circuit 37 are to be delayed for about 2.5 sec with respect to acoustic signals inputted through the input terminals R0, L0.

In the abovesaid manner, the magnetic tape 42 is operated to record the digital video signals first, followed by the digital acoustic signals. In other words, digital acoustic signals corresponding to the digital video signals recorded in the magnetic tape 42 are to be delayed in recording for about 2.5 sec with respect to the digital video signals.

Next, the operation used to reproduce signals will be detailed.

Signals read out from the magnetic tape 42 through the rotary head, etc are fed to the reproduced signal processing unit 43 and sequentially to each and every bit, to the line 44 synchronously with the rise of the clock signal CK1. Accordingly, during the period W1, the digital signals d6 are applied as digital acoustic signals d7 to the D/A conversion circuit 47. During the period W2, the digital signals are applied as digital acoustic signals d8 to the D/A conversion circuit 48, and during W3 as digital video signals 49 to the S/P conversion circuit 49. In other words, each digital signal d6 fed to the line 44 during the periods W1 and W2 are the digital acoustic signals corresponding to the speakers arranged at the front-right and front-left sides of the audience, and those fed to the line 44 during the period W3 are digital video signals.

Digital video signals d10 outputted from the S/P conversion circuit 49 are written sequentially, for example, into one image memory 36a. The time required for writing digital video signals at one field into the image memory 36a is about 2.5 sec., similar to that required for reading-out the digital video signals from the image memory 36a to the record signal processing unit 41. When the writing of digital video signals for one scene finishes, the image memory 36a feeds out all of the digital video signals to the line 50 and then to the D/A conversion circuit 51 at 1/60 sec. The operation runs continuously.

During the time interval when the digital video signals are read out of the image memory 36a, digital video signals for the next still picture are written into the other image memory 36b. As seen, the image memories 36a, 36b have alternate operations to each other, so that when one image memory is being read out, the other image memory is being given new information in the form of digital video signals. This feature allows a new still picture to be displayed about every 2.5 sec or more on a device connected with the output terminal V1.

Analog acoustic signals corresponding to digital signals d7, d8 of the digital signals d6 fed out to the line 44 from the reproduced signal processing unit 43 are output from terminals R1, L1 without being delayed. Analog video signals corresponding to digital video signals d9 are fed to the output terminal V1 with a delay of about 2.5 sec since they must be stored in the image memories 36a, 36b. However, digital acoustic signals corresponding to digital video signals expressing a still picture have been recorded on magnetic tape 42 with a delay of about 2.5 sec as mentioned, so that the video signals fed out to the output terminal V1 and the acoustic signals fed out to the output terminals R1, L1 have a relationship with each other similar to that which exists between video signals and acoustic signals as they are recorded through the input terminals. This interrelation between the video signals and the acoustic signals keeps the proper synchronization of images with voices upon reproduction.

The present invention makes possible the recording of sounds and images by the use of digital signals and the reproduction of still pictures and sounds by use of digital signals in the so-call DAT (Degital Audio Tape Recorder), thereby remarkably improving the utility of DAT.

In the form described, units for recording and reproducing of video signals are referred to as every one field. This unit may alternatively be at every frame.

When using one frame instead of one field as the unit, since one frame may comprise two fields, and time for one frame is 1/30 (sec), therefore the memory capacity of the image memories 36a, 36b shown by the formula (1) is represented as follows;

$$P1 = 14.3 \text{ (MHz)} \times 8 \text{ (bits)} \times 1/30 \text{ (sec)} \quad (1)$$
$$= 3.822 \text{ (M bits)}$$

Also, the read-out time for digital video signals shown by the formula (3) shall be as follows.

$$P1/R = 4.98 \text{ (sec)} \quad (3)'$$

Furthermore, the recording time of magnetic tape shown by the formula (4) is represented as follows.

$$4.98 \text{ (sec)} + 1/30 \text{ (sec)} \approx 5 \text{ (sec)} \quad (4)'$$

This feature causes the digital acoustic signals fed to the P/S conversion circuit 91, 92 to be delayed about 5 sec with respect to acoustic signals inputted through the input terminals R0, L0, so that the digital acoustic signals are recorded in the magnetic tape 42 with a delay of about 5 sec with respect to digital video signals.

Also, upon reproduction of recorded signals, digital video signals are fed out at 1/30 sec intervals from the image memories 36a, 36b after writing has been completed, to the D/A conversion circuit 51 through the line 50, so that the display device connected to the output terminal V1 displays still pictures that change at a time interval of about 5 sec or more.

In this embodiment, an explanation has been given for the case using two image memories that can store digital video signals for one scene. Alternatively, three or more image memories may be used in which case the recording of acoustic signals and video signals for displaying still pictures by use of digital signals can be realized.

Further, a 2 channel mode only may be available other than the 4 channel mode referred to in the above described embodiment. In this case, one of the channels is assigned to recording/reproducing operation of the video signals. Furthermore, in 4 channel mode construction, one channel may be assigned to the recording/reproducing of video signals.

In this embodiment, the digital acoustic signals can be delayed during the recording operation, but may alternatively be delayed upon operation to reproduce the sound with the same effects. Specifically, when employing three or more image memories, two memories are used to record digital video signals and the remaining one for recording and delay of acoustic signals during reproduction.

As seen from the above, the present invention provides a further extension of the use of a magnetic tape recording/reproducing device and particularly improves the function of the device.

What is claimed is:

1. A magnetic tape recording and reproducing device comprising:
   acoustic converting means for converting analog acoustic signal into digital acoustic signal by sampling the analog acoustic signals with a first sampling frequency;
   video converting means for converting analog video signals into digital video signals by sampling the analog video signals with a second sampling frequency;
   recording means for recording on a magnetic tape sequentially the digital acoustic signals and the digital video signals; and
   reproducing means for reproducing the digital acoustic signals and the digital video signals recorded on the magnetic tape;
   said recording means recording the digital acoustic signals and digital video signals as a plurality of sets wherein each set is cyclically recorded at a frequency equal to said first sampling frequency;
   said recording means recording in a four channel mode to record four kinds of digital acoustic signals sequentially and said digital acoustic signals being recorded in two channels of said four channels and said digital video signals being recorded in another two channels;
   said recording means including,
      first and second memories, each memory having at least a memory capacity to store a field of digital video signals,
      writing means for writing the digital acoustic signals converted by said acoustic converting means sequentially into said first memory and for writing the digital video signals converted by said video converting means into said second memory; and read-out means for reading out of said first and second memories, after writing an entire memory capacity of said first and second memories, the digital acoustic signals and the digital video signals in sequential order; and said recording means recording on the magnetic tape sequentially the digital acoustic signals and digital video signals read out by said read-out means, thereby harmonizing sound and picture.

2. The magnetic tape recording and reproducing device according to claim 1 wherein said reproducing means comprises:

reading means for reading sequentially the digital acoustic signals and the digital video signals recorded on the magnetic tape;

acoustic converting means for converting the digital acoustic signals read by said reading means into an analog acoustic signals;

first and second memory means for storing the digital video signals;

writing means for writing the digital video signals read by the reading means alternately into said first and second memory means of said reproducing means;

read-out means for reading out alternately from said first and second memory means of said reproducing means the digital video signals after the digital video signals are completely written in said first and second memory means; and video converting means for converting the digital video signals read out by said read-out means into analog video signals.

3. The magnetic tape recording and reproducing device according to claim 1 wherein the first sampling frequency is 32 Khz and said acoustic conversion means samples analog acoustic signals with a sampling frequency of 32 Khz to convert the analog acoustic signals into digital acoustic signals of 12 bits.

4. The magnetic tape recording and reproducing device according to claim 1 wherein the second sampling frequency is 14.3 Mhz and said video conversation means samples analog video signals with a sampling frequency of 14.3 Mhz to convert the analog video signals into digital video signals of 8 bits.

* * * * *